Nov. 20, 1962 R. E. BLAND 3,064,715
BONDING JIG

Filed Aug. 17, 1960 2 Sheets-Sheet 1

RICHARD E. BLAND
INVENTOR.

BY
*J.C. Muller*
ATTORNEY

Nov. 20, 1962        R. E. BLAND         3,064,715
                     BONDING JIG
Filed Aug. 17, 1960                    2 Sheets-Sheet 2

*RICHARD E. BLAND*
INVENTOR.

BY

*ATTORNEY*

United States Patent Office 3,064,715
Patented Nov. 20, 1962

3,064,715
BONDING JIG
Richard E. Bland, State College, Pa., assignor, by mesne assignments, to the United States of America as represented by the Secretary of the Navy
Filed Aug. 17, 1960, Ser. No. 50,297
6 Claims. (Cl. 156—556)

This invention relates to jigs and more particularly to bonding jigs for transducers.

The use of a bonding jig of the type described hereinafter is used in the construction of the essential elements of an application, Serial No. 629,430, filed November 21, 1956, for "Directional Underwater Magnetostriction Transducer."

The problem of going from a small to a large diameter transducer to achieve a longer search distance at greater depths presented problem not heretofore encountered in the construction of a transducer. In small transducer construction, the pressure plate was not critical as to a bow because of the small amount of pressure applied, but in the construction of a larger transducer where bowing occurred, it was overcome by the present invention.

The jig's main function is to maintain an equal pressure and fixed orientation of numerous elements in the process of being bonded to a surface. This is accomplished by an arrangement of adjustable spring-loaded pistons attached to a rigid top pressure plate. Although the jig is described in connection with magnetostrictive transducers, it is understood that the invention may be used with any type of bonding where an equal and constant pressure on all elements to be bonded is essential. For the purpose of clarity and simplicity, the jig may be considered as having; a bottom plate, locating plates, and a top pressure plate. The flat bottom plate and a circular band forming the sides are so designed to contain the surface on which the elements are to be attached. The locating plate is composed of two flat plates secured together at a predetermined distance, adapted to orient and position the elements to be bonded. The top pressure plate comprises a thick flat plate with a plurality of small and large spring-loaded pistons which on adjustment, apply an equal and constant pressure upon the elements being bonded. In operation, the jig, rubber window, grid, and units are preheated in an oven. The rubber window, grid, and units are then assembled into the jig and the top plate adjusted to apply a predetermined amount of pressure upon the grid and units. Then the assembled jig is placed in the oven, heated, removed, and cooled. The jig is then disassembled and the bonded elements removed and tested.

It is an object of the present invention to provide a jig for simultaneously bonding numerous units to a surface in a one-step operation.

Another object of the present invention is to provide a jig means for insuring an accurate alignment of units during a bonding operation.

Still another object of the invention is to provide a clamping means to maintain an equal and constant pressure on units during a bonding operation.

Other objects and a fuller understanding of the invention may be had by referring to the following description and claims taken in conjunction with the accompanying drawings, in which:

Figure 1:
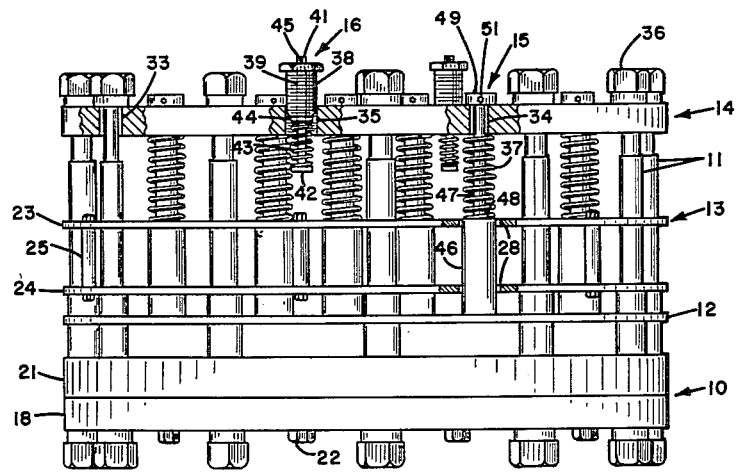
FIGURE 1 is an elevation view of the bonding jig assembly.

With reference to the drawings, the like reference characters designate the same parts throughout the several views shown. The main elements of the bonding jig comprising of a base 10, standoff bolts 11 are connected to and perpendicular to the base, guide plate 12, unit locating plates 13, and top pressure plate 14 all of which are assembled on standoff bolts 11. Large and small spring-loaded pistons 15 and 16, extending through plate 14, and rigidly held by the top plate are adapted to exert pressure on the elements to be bonded.

The base 10 has grooves 17 (shown in dotted lines in FIGURE 2) in the bottom surface of the flat plate 18 to increase the heat transmission. A threaded hole 19 directly in the center of the flat plate 18 may be used for an air hose attachment to blow free the rubber window (shown in patent application, Serial No. 629,430, filed November 21, 1956, FIGURE 1, numeral 13) when it sticks to the inside surface of the base 10 during the curing cycle. The threaded hole 19 may also be used for thermocouple insertion as explained hereinbelow. Band 21, forming the upper portion of the base 10, is secured by bolts 22 and standoff studs 11 to the flat plate. Guide plate 12 is secured to the grid (also shown in patent application, Serial No. 629,430, filed November 21, 1956, FIGURE 1, numeral 10) to achieve a concentric alignment with the rubber window at assembly.

Figure 3:
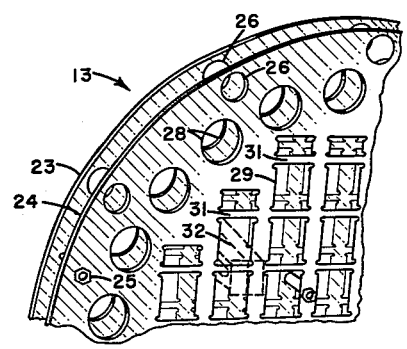
FIGURE 3 is a partial perspective view showing the locating plates with a unit (shown in dotted lines) assembled.

The unit locating plates 13 comprising of two flat locating plates 23 and 24 that are held in a fixed space relationship by spacers 25 located close to the periphery of the plates. The flat locating plates 23 and 24 have aligned passages 26 to receive the top half of standoff studs 11 and seat on shoulder 27 at assembly. Clearance passages 28 are further provided for the large spring-loaded pistons 15 to let the bottom of the piston rest on guide plate 12. The rectangular openings 29 and centering bars 31, both a part of the locating plate 13, are provided to allow positioning of the unit 32 to be bonded (as shown by dotted lines in FIGURE 3). Units 32 magnetostrictive transducers) are inserted in the rectangular openings 29 such that a centering bar 31 is disposed between the legs of each unit and held in place by clips (such as binder clips not shown) on the opposite side to prevent the units from prematurely coming into contact with the rubber window at assembly. After the unit locating plates 13 are in their assembled position, the clips may be removed as described hereinbelow.

Clearance passages 33 close to the periphery on the top pressure plate 14 receive standoff studs 11. Passages 34 are in the top pressure plate to freely receive the top portion of large spring-loaded pistons 15. The large pistons are designed to apply the proper pressure to the guide plate 12 which in turn, transfers the pressure to the grid being bonded to the rubber window. The threaded passages 35 receive small spring-loaded pistons 16 that applies the proper bonding pressure individually to each unit 32. It is to be noted that the bonding pressure applied by the large spring-loaded pistons 15 is obtained by tightening the top pressure plate 14 with nuts 36 to provide the proper loading on springs 37.

The threaded top portion 38 of the small spring-loaded piston 16 and the standoff bolts 11 are designed with Acme threads to avoid galling pressure at elevated temperatures. A passage 39 through the axis of the threaded portion 38 receives a shaft 41. Fixed to the opposite end of the shaft 41 is a head 42 that seats a spring 43 when assembled on the shaft 41. The head 42 also applies pressure to the individual units 32 when assembled. After the spring 43 is assembled on the shaft 41 and seated on head 42, a washer 44 is placed on top of the springs 43, thus, keeping the spring in one position when the threaded portion 38 is turning and pressure is being applied. A roll pin 45 is inserted at the extreme opposite end from the head 42 on shaft 41, thus, keeping the spring, washer, and shaft from separating after assembled to the threaded portion 38.

The large spring-loaded piston 15 has a large cylindrical surface 46 at the one end and a small cylindrical surface 47 at the opposite end with the two meeting approximately at the center to create a shoulder 48 to seat the spring 37 when assembled over the small cylindrical surface 47. A collar 49 secures the small end of the piston after inserted into passage 34 of the top pressure plate 14 by means of a set screw 51.

It may now be apparent that when the top pressure plate 14 is assembled the small spring-loaded pistons 16 and the large spring-loaded pistons 15 are fastened thereto and are automatically aligned with the passages as described hereinabove.

Operation of Bonding

Figure 2:
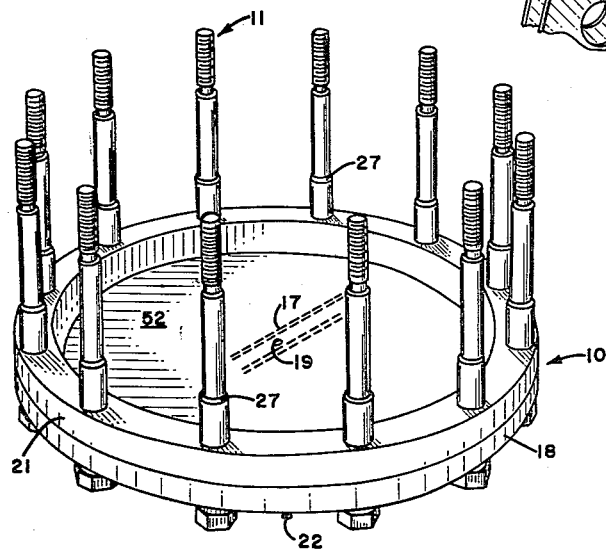
FIGURE 2 is a perspective view of the jig base in its normal position at assembly.

With reference to the rubber window, grid, and units referred to in the operation are elements found in applicant's prior application, Serial No. 629,430, filed November 21, 1956, FIGURE 1.

Figure 4:
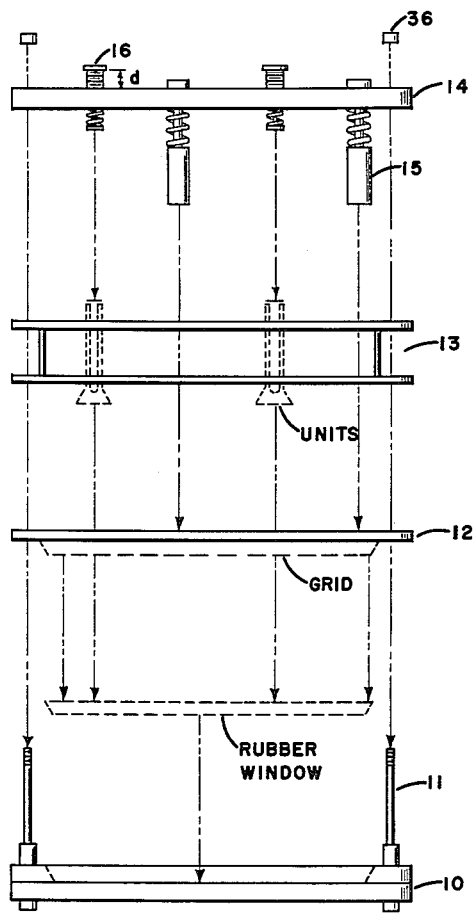
FIGURE 4 is an exploded diagrammatic view of the jig with the elements to be bonded shown in dotted lines.

Referring now to FIGURE 4, all parts are preheated in the oven at a predetermined temperature to avoid excessive heating time when curing. The rubber window is cleaned with solvents such as methylethylketone followed by Clorox. The rubber window is then rinsed with scalding water and let dry. The grid is then washed with a solvent such as methylethylketone and secured to guide plate 12 on the adjacent back side of the grid to assure alignment at assembly. Units for one complete transducer are washed with a solvent such as methylethylketone, only two are shown for simplicity. The grid and units are then dried and two thin applications of adhesive material are applied to the mating surfaces of each element. Before the precuring cycle, the front face of the rubber window and the interface 52 of the base 10 are dusted with powder, thus, preventing the rubber window from sticking. The elements are then placed in an oven of the conventional type such as a "Dispatch Oven" made by the Dispatch Oven Company.

Figure 5:
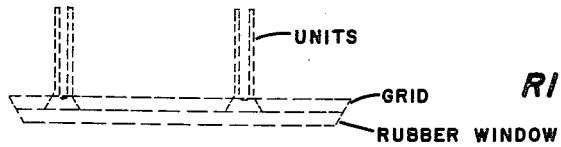
FIGURE 5 illustrates the respective position of the units, grid and rubber window after the completion of the bonding operation.

After removing the bonding jig, units, grid, and rubber window from the oven, the oven is then set at a higher temperature. While the elements are hot, they are assembled into the disassembled bonding jig in the sequence shown in FIGURE 4 as explained hereinafter. The rubber window is dropped into position on the inside surface 52 of the base 10. The grid is placed concentric about the rubber window by aligning the guide plate 12 attached thereto to designated studs 11 and lowered until it comes in contact with the rubber window. The locating plates 13, with the units 32 held in place by clips (not shown), is mounted in an intermedite point on shoulders 27 of studs 11 and the clips released individually as the face of the units are placed on the flat surface of the rubber window through openings in the grid. The top pressure plate 14 has small spring-loaded pistons 16 that apply uniform pressure on each unit 32 by a takeup means such as threaded portion 38 being set at a predetermined distance "d" shown in FIGURE 4 from the top surface of the top pressure plate 14 before assembly. The top pressure plate 14 is now in a position to have a predetermined amount of pressure applied (with a torque wrench) to the top pressure plate 14 by nuts 36 threaded onto studs 11. A thermocouple is attached to threaded hole 19 in the base 10 of bottom plate 18 before placing the jig in the oven. When the temperature recorded by the thermocouple reaches a designated temperature, the oven is reset. When the oven reaches the reset temperature, the transducer cures for a prescribed time, then, is removed and let cool. The transducer is then removed from the bonding jig as shown in FIGURE 5. The elements (rubber pad, grid, and units) bonded together are shown in the patent application, Serial No. 629,430, filed November 21, 1956, FIGURE 1. The transducer is tested to determine the adhesion of the units 32 to the rubber window. The strength of the bond is and should be greater than the strength of the rubber.

Although the invention has been described in its preferred embodiment, it is understood that the present disclosure of the preferred form has been made only by way of example and that numerous modifications in the details of construction and the combination and arrangement of parts may be resorted to without departing from the spirit and the scope of the invention as hereinafter claimed.

What is claimed is:

1. In a jig adapted to bond a grid and units to a medium, the combination comprising a base: means adapted to receive said medium; a plurality of studs secured in an outward direction to the periphery of said base means; a guide plate positioned by said studs and fastened to said grid; means adapted to position said units upon said medium; spring-loaded pressure means adapted to apply individual predetermined inward pressure to said units.

2. In a jig adapted to bond a grid and units to a surface, the combination comprising: a base plate adapted to receive said surface; a plurality of studs secured in an outward direction to the periphery of said base plate; a guide plate affixed to said grid wherein said guide plate has a plurality of passages adapted to receive said studs to assure concentricity between said grid and said surface; a first and a second locating plate adjacent to said grid plate to position said units upon said surface; spring-loaded pressure means secured to said studs adapted to apply a predetermined pressure to said units and said grid during bonding to said surface.

3. In a jig adapted to bond a grid and units to a surface, the combination comprising: a base plate adapted to receive said surface; a plurality of studs connected to the periphery of said base plate; a first and a second locating plate positioned by said studs having a plurality of aligned openings adapted to position said units upon said surface; pistons extending through said aligned openings to apply a predetermined pressure to said grid during bonding to said surface.

4. In a jig adapted to bond vibration units and a grid to a rubber surface, the combination comprising: a base plate adapted to receive said rubber surface; a plurality of studs fixed to the periphery of said base plate; a guide plate affixed to a grid; a first and a second locating plate adjacent to said guide plate to position said vibration units upon said rubber surface; spring-loaded pistons affixed to a pressure plate adapted to apply a predetermined and simultaneous pressure individually to said vibrator units and said grid during bonding to said rubber surface.

5. In a jig adapted to bond vibrator units and a grid to a rubber surface, the combination comprising: a base plate adapted to receive said rubber surface; a plurality of studs fixed to the periphery of said base plate; a guide plate affixed to said grid wherein said guide plate has a plurality of passages to receive said studs to assure concentricity between said grid and said rubber surface; a first and a second locating plate adjacent to said guide plate to position said vibrator units upon said rubber surface; a top pressure plate adjacent to said first and second locating plates adapted to apply a predetermined pressure to said vibrator units and said grid simultaneously through spring-loaded pistons fixed to said top pressure plate.

6. In a jig adapted to bond vibrator units and a grid to a rubber window, the combination comprising: a base plate adapted to receive said rubber window; a plurality of studs fixed to the periphery of said base plate; a guide plate affixed to said grid wherein said guide plate has a plurality of passages to receive said studs to assure concentricity between said grid and said rubber window; a first and a second locating plate having a plurality of aligned openings, said openings being separated by narrow portions of said locating plates, said narrow portions adapted to fit between legs of said vibrator units and position said vibrator units with regard to clearance openings in said grid; said first and second locating plates held in fixed space relationships having a plurality of passages to receive intermediate shoulders of said studs and disposed adjacent to said guide plate to position said vibrator units upon said rubber window; a top pressure plate adjacent to said first and second locating plates secured to said studs applying a predetermined pressure to said vibrator units and said grid simultaneously through adjustable pistons fixed to said top pressure plate.

References Cited in the file of this patent

UNITED STATES PATENTS 1,885,690  Doyle _____ Nov. 1, 1932